United States Patent
Wakahara et al.

(10) Patent No.: US 7,260,928 B2
(45) Date of Patent: Aug. 28, 2007

(54) DIAGNOSTIC DEVICE FOR SECONDARY AIR SUPPLY SYSTEM

(75) Inventors: Keiji Wakahara, Inazawa (JP); Masahiko Yamaguchi, Obu (JP)

(73) Assignee: Denso Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/224,118

(22) Filed: Sep. 13, 2005

(65) Prior Publication Data

US 2006/0059898 A1    Mar. 23, 2006

(30) Foreign Application Priority Data

Sep. 17, 2004    (JP)    ............... 2004-270869

(51) Int. Cl.
*F01N 3/00* (2006.01)
(52) U.S. Cl. ............... 60/289; 60/277; 60/290; 60/293
(58) Field of Classification Search ............... 60/277, 60/289, 290, 293, 299
See application file for complete search history.

(56) References Cited

U.S. PATENT DOCUMENTS

| | | | | |
|---|---|---|---|---|
| 5,615,552 A | * | 4/1997 | Shimasaki et al. ............ | 60/277 |
| 5,735,121 A | * | 4/1998 | Kato et al. ............ | 60/277 |
| 5,782,086 A | * | 7/1998 | Kato et al. ............ | 60/274 |
| 6,023,401 A | * | 2/2000 | Hashimoto et al. ............ | 361/93.1 |
| 6,830,043 B2 | * | 12/2004 | Morinaga et al. ............ | 123/698 |
| 6,918,245 B2 | * | 7/2005 | Hirooka et al. ............ | 60/289 |
| 6,983,590 B2 | * | 1/2006 | Roelle et al. ............ | 60/289 |
| 2003/0061805 A1 | | 4/2003 | Hirooka et al. | |
| 2004/0011027 A1 | | 1/2004 | Hirooka et al. | |

* cited by examiner

*Primary Examiner*—Thomas Denion
*Assistant Examiner*—Diem Tran
(74) *Attorney, Agent, or Firm*—Nixon & Vanderhye P.C.

(57) ABSTRACT

A secondary air control system supplies secondary air to the upstream of a catalyst purifying exhaust gas in an exhaust passage of an engine. A diagnostic device includes a secondary air detecting means that detects a secondary air information related to pressure of secondary air. An abnormality diagnostic means performs an abnormality diagnostic operation of the secondary air control system in accordance with the secondary air information. A voltage detecting means that detects a power source voltage information related to power source voltage supplied to the secondary air control system. An evaluating condition correcting means that corrects an evaluating condition, which is used for evaluating abnormality in the secondary air control system in accordance with a power source voltage information.

2 Claims, 5 Drawing Sheets

| VSA (V) | 6 | 8 | 10 | 12 | 14 | 16 |
|---|---|---|---|---|---|---|
| kTH (kPa) | 2.7 | 4 | 5.1 | 6.1 | 6.8 | 7.4 |

FIG. 6

DIAGNOSTIC DEVICE FOR SECONDARY AIR SUPPLY SYSTEM

CROSS REFERENCE TO RELATED APPLICATIONS

This application is based on and incorporates herein by reference Japanese Patent Application No. 2004-270869 filed on Sep. 17, 2004.

FIELD OF THE INVENTION

The present invention relates to an abnormality diagnostic device for a secondary air supply system of an internal combustion engine, the secondary air supply system supplying secondary air to the upstream of a catalyst for purifying exhaust gas in an exhaust passage of the engine.

BACKGROUND OF THE INVENTION

According to US20030061805A1 (JP-A-2003-83048) and US20040011027A1 (JP-A-2004-11585), a secondary air supply system includes an air pump that supplies secondary air to the upstream of a catalyst that purifies exhaust gas in an exhaust passage of the engine. This operation enhances purification (oxidization) of HC and CO contained in exhaust gas, and accelerates warming-up of the catalyst with heat generated by reaction (oxidization) of HC and CO.

When a malfunction occurs in the secondary air supply system, exhaust emission may be degraded. According to the secondary air supply system disclosed in US20030061805A1 and US20040011027A1, a pressure sensor is provided to evaluate abnormality of the secondary air supply system in accordance with pressure of secondary air detected using the pressure sensor in an abnormality diagnostic operation.

Variation in discharge capacity of the air pump, which supplies secondary air, is caused by variation in voltage of a power source (battery). Specifically, when voltage (power source voltage) of the power source decreases, the discharge capacity of the air pump becomes low. In this situation, it is conceivable that the abnormality diagnostic operation is prohibited not to make an erroneous determination of abnormality in the secondary air supply system.

However, in general, secondary air is supplied in a catalyst warm-up period immediately after the engine is started. When the abnormality diagnostic operation is prohibited when the power source voltage is low, the abnormality diagnostic operation cannot be performed in a normal operation, in which secondary air is normally supplied, due to undervoltage of the power source. As a result, frequency of the abnormality diagnostic operation becomes low. In particular, the air pump is supplied with a large current. Therefore, when the battery is substantially exhausted, the air pump is always in an undervoltage condition, and consequently the abnormality diagnostic operation cannot be performed at all.

A particular charge system performs a charge control when an engine is started, or the like. Specifically, the power source voltage is gradually returned to an initial voltage when an undervoltage condition is detected in the charge control, so that drivability is restricted from being degraded due to quick change in the power source voltage. In this case, the undervoltage condition continues for a long period due to the charge control, and consequently the abnormality diagnostic operation is prohibited for a long period. As a result, frequency of the abnormality diagnostic operation becomes low.

Furthermore, the discharge capacity of the air pump changes corresponding to the power source voltage. Accordingly, pressure of secondary air detected using the pressure sensor changes corresponding the power source voltage. Therefore, when the abnormality diagnostic operation of the secondary air supply system is performed in accordance with the detection signal of the pressure sensor, an erroneous determination may be made due to variation in detection signal of the pressure sensor caused by variation in power source voltage.

SUMMARY OF THE INVENTION

In view of the foregoing and other problems, it is an object of the present invention to produce an abnormality diagnostic device for a secondary air supply system of an internal combustion engine, the abnormality diagnostic device being capable of performing an abnormality diagnostic operation of the secondary air supply system even when voltage of a power source decreases so that frequency of the abnormality diagnostic operation is capable of being maintained. It is another object of the present invention to produce an abnormality diagnostic device that is capable of restricting from making erroneous determination of abnormality in the secondary air supply system due to variation in voltage of the power source so that reliability of the abnormality diagnostic operation is capable of being enhanced.

According to one aspect of the present invention, a secondary air control system supplies secondary air to an upstream of a catalyst in an exhaust passage of an internal combustion engine. The catalyst purifies exhaust gas. A diagnostic device for the secondary air control system for the internal combustion engine includes a secondary air detecting means, an abnormality diagnostic means, a voltage detecting means, and an evaluating condition correcting means. The secondary air detecting means detects secondary air information, which relates to at least one of a flow amount of secondary air and pressure of secondary air. The abnormality diagnostic means performs an abnormality diagnostic operation of the secondary air control system in accordance with the secondary air information detected using the secondary air detecting means. The voltage detecting means detects power source voltage information, which relates to power source voltage supplied to the secondary air control system. The evaluating condition correcting means corrects an evaluating condition for evaluating abnormality in the secondary air control system. The evaluating condition correcting means corrects the evaluating condition in accordance with the power source voltage information, which is detected using the voltage detecting means.

Thereby, even when the power source voltage varies, the evaluating condition correcting means corrects the evaluating condition, which is for evaluating the abnormality in the secondary air control system, in accordance with the power source voltage information such as the variation in the power source voltage. Thus, the diagnostic device can accurately perform the abnormality diagnostic operation to the secondary air control system.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Embodiment

Figure 1:
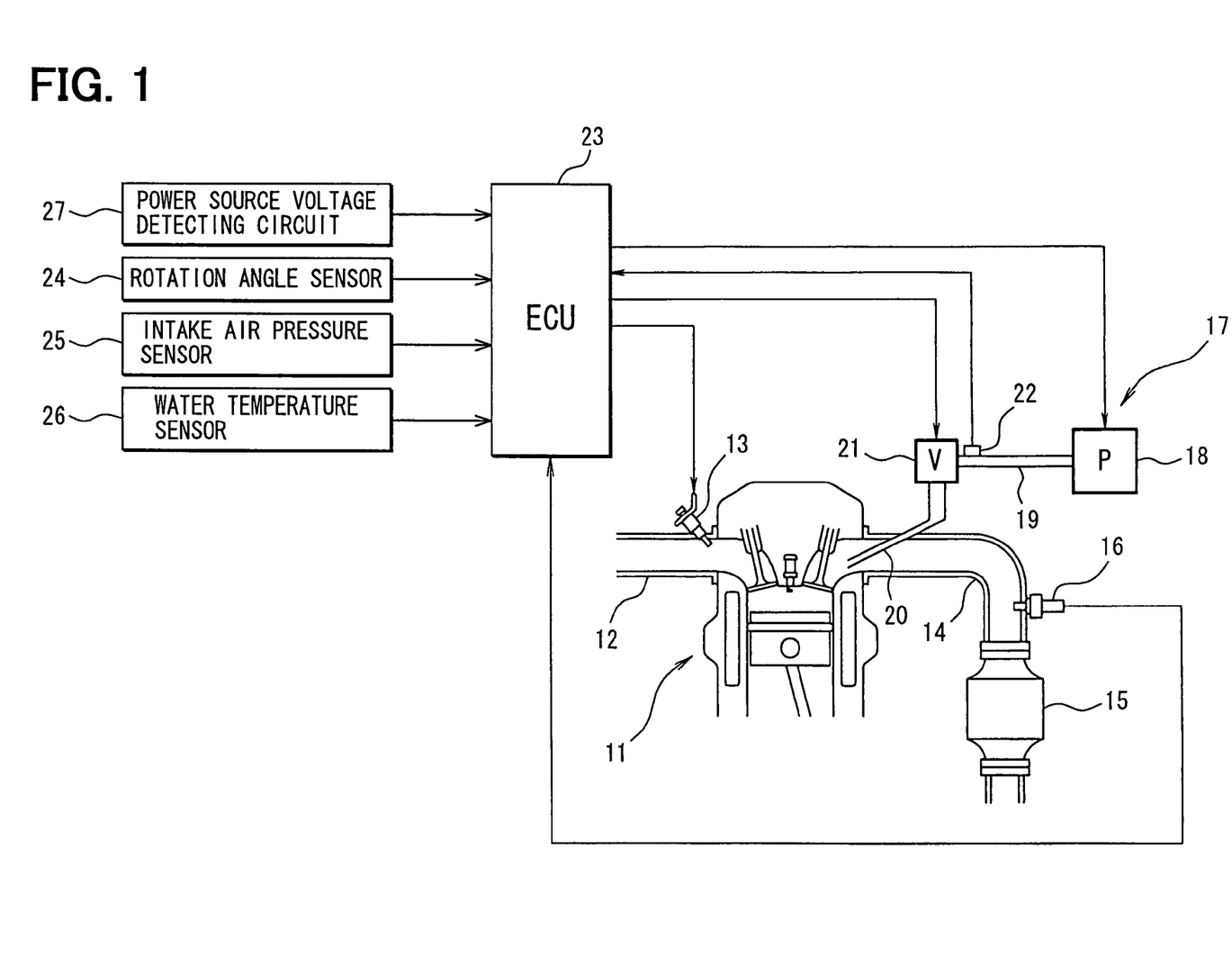
FIG. 1 is a schematic view showing an abnormality diagnostic device for a secondary air supply system, according to an embodiment of the present invention.

As shown in FIG. 1, an internal combustion engine 11 includes cylinders that are respectively connected to an intake manifold 12. A fuel injection valve 13 is provided in the vicinity of each intake port of the intake manifold 12 to inject fuel into a combustion chamber. The engine 11 includes an exhaust pipe (exhaust passage) 14, to which a catalyst 15 such as three-way catalyst is provided to purify CO, HC, NOx, and the like contained in exhaust gas. An air-fuel ratio sensor 16 is provided to the upstream of the catalyst 15 for detecting an air-fuel ratio or a lean-rich condition of exhaust gas. Alternatively, an oxygen sensor may be provided instead of the air-fuel ratio sensor 16.

A secondary air supply system 17 supplies air into the upstream of the catalyst 15 in the exhaust pipe 14. The secondary air supply system 17 includes an air pump 18 that is driven using an electric motor. The air pump 18 discharges secondary air into each secondary air supply nozzle 20 of each cylinder through a discharge pipe 19, so that the secondary air is supplied into the exhaust manifold (exhaust passage) of the cylinder.

A control valve 21 is provided to the discharge pipe 19 of the air pump 18 for opening and closing the discharge pipe 19. A pressure sensor 22 is provided in the discharge pipe 19 between the control valve 21 and the air pump 18. The pressure sensor 22 serves as a secondary air information detecting means (secondary air detecting means).

The air pump 18 and the control valve 21 are controlled using an engine control unit (control means, ECU) 23 in the secondary air supply system 17. The ECU 23 inputs various signals output from various sensors such as a rotation angle sensor 24, an intake air pressure sensor 25, and a water temperature sensor 26, for detecting an operating condition of the engine. The ECU 23 controls an amount of fuel injection, an ignition timing, and the like, in accordance with the operating condition of the engine.

Figure 2:
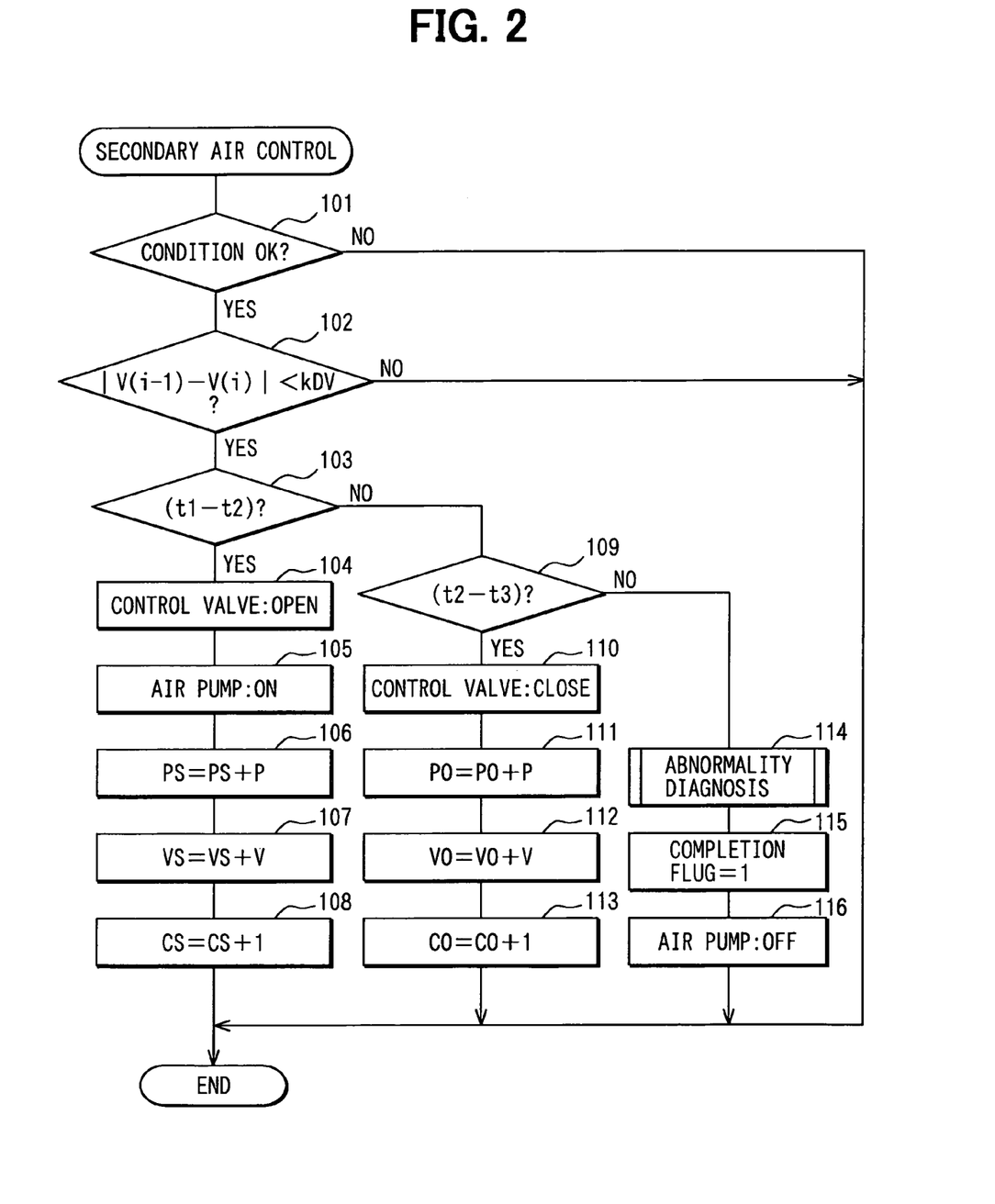
FIG. 2 is a flowchart showing a secondary air control routine, according to the embodiment.

The ECU 23 executes a secondary air control routine shown in FIG. 2 to control the secondary air supply system 17 that performs a secondary air supply operation. Furthermore, the ECU 23 executes an abnormality diagnostic routine for the secondary air control system 17, so that the ECU 23 determines abnormality in the secondary air control system 17.

Figure 6:
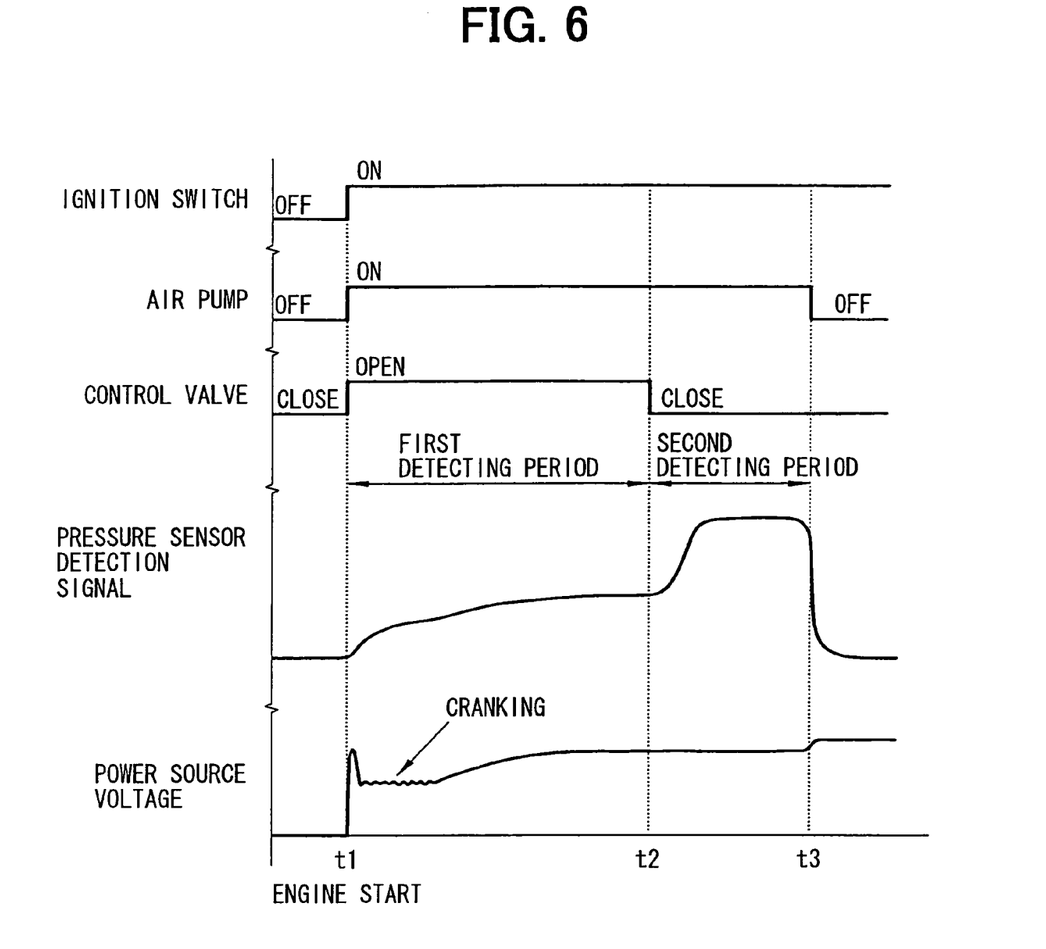
FIG. 6 is a time chart showing an example of an abnormality diagnostic operation, according to the embodiment.

Next, an abnormality diagnostic operation of the secondary air control system 17 is described in reference to the time chart shown in FIG. 6. In this embodiment, in general, secondary air is supplied by the secondary air control system 17 in a catalyst warm-up period immediately after starting the engine. Specifically, secondary air is supplied when a driver turns an ignition switch ON at the timing t1, in which the air pump 18 is turned ON and the control valve 21 is opened to start supplying secondary air.

When the driver further turns the ignition switch from the ON position to a START position, the starter (not shown) is energized, and a cranking operation starts. In this situation, voltage (power source voltage) of the power source transiently decreases, however the power source voltage gradually recovers to an initial voltage by a charge control after finishing the cranking operation, i.e., after finishing the engine start.

At the timing t2 after elapsing a predetermined time such as 5 to 20 sec from starting the air pump 18, the ECU 23 closes the control valve 21 to stop supplying secondary air into the exhaust pipe 14. However, the ECU 23 continues operation of the air pump 18 at a predetermined time cycle such as 10 to 20 sec after the timing t2 for performing the abnormality diagnostic operation of the secondary air control system 17.

The period from the timing t1, in which the air pump 18 is started, to the timing t2, in which the control valve 21 is closed, is defined as a first detecting period (t1–t2). The period from the timing t2, in which the control valve 21 is closed, to the timing t3, in which the air pump 18 is stopped, is defined as a second detecting period (t2–t3).

The ECU 23 integrates a pressure signal (secondary air pressure) of secondary air detected using the pressure sensor 22 for a predetermined time in the first detecting period (t1–t2). The ECU 23 divides the integrated value of the secondary air pressure in the first detecting period (t1–t2) by the number of integration of the secondary air pressure to calculate an average secondary air pressure (first average pressure) in the first detecting period (t1–t2).

The ECU 23 integrates the secondary air pressure detected using the pressure sensor 22 for a predetermined time in the second detecting period (t2–t3). The ECU 23 divides the integrated value of the secondary air pressure in the second detecting period (t2–t3) by the number of integration of the secondary air pressure to calculate an average secondary air pressure (second average pressure) in the second detecting period (t2–t3).

The ECU 23 calculates a difference (differential average secondary air pressure) between the first average pressure in the first detecting period (t1–t2) and the second average pressure in the second detecting period (t2–t3). The ECU 23 evaluates abnormality in the secondary air control system 17 such that whether the differential average secondary air pressure is equal to or greater than a threshold.

The secondary air pressure detected using the pressure sensor 22 varies due to variation in the power source voltage. Therefore, the ECU 23 corrects both the detected secondary air pressure (average secondary air pressure) and the threshold in accordance with the power source voltage. Specifically, the ECU 23 integrates the power source voltage detected using a power source voltage detecting circuit 27 for a predetermined time in the first detecting period (t1–t2). The power source voltage detecting circuit 27 serves as a power source voltage detecting means (voltage detecting means).

The ECU 23 divides the integrated value of the power source voltage in the first detecting period (t1–t2) by the number of integration of the power source voltage to calculate an average power source voltage (first average voltage) in the first detecting period (t1–t2). The ECU 23 integrates the power source voltage detected using the power source voltage detecting circuit 27 for a predetermined time in the second detecting period (t2–t3). The ECU 23 divides the integrated value of the power source voltage in the second detecting period (t2–t3) by the number of integration of the power source voltage to calculate an average power source voltage (second average voltage) in the second detecting period (t2–t3).

The ECU 23 compensates variation in the secondary air pressure caused by variation in the power source voltage in both the two detecting periods (t1–t2), (t2–t3) in accordance with a relationship between the first average voltage in the first detecting period (t1–t2) and the second average voltage in the second detecting period (t2–t3).

Specifically, in this embodiment, the ECU 23 defines a standard, which is the power source voltage in one of the first detecting period (t1–t2) and the second detecting period (t2–t3). The ECU 23 corrects the average secondary air pressure in the other of the first detecting period (t1–t2) and the second detecting period (t2–t3) with respect to the standard in accordance with a relationship between the first average voltage and the second average voltage. Thereby, the ECU 23 calculates the average secondary air pressure while excluding an influence caused by variation in the power source voltage in the two detecting periods (t1–t2), (t2–t3).

Subsequently, the ECU 23 calculates the differential average secondary air pressure between the first average pressure in the first detecting period (t1–t2) and the second average pressure in the second detecting period (t2–t3). The ECU 23 obtains the threshold from a threshold calculation table shown in FIG. 5 in accordance with the standard, which is the power source voltage in the one of the first detecting period (t1–t2) and the second detecting period (t2–t3). Thus, the ECU 23 compares the differential average secondary air pressure with the threshold in accordance with both the differential average secondary air pressure and the threshold, while excluding an influence caused by variation in the power source voltage, so that the ECU 23 properly evaluates the abnormality in the secondary air control system 17.

Figure 3:
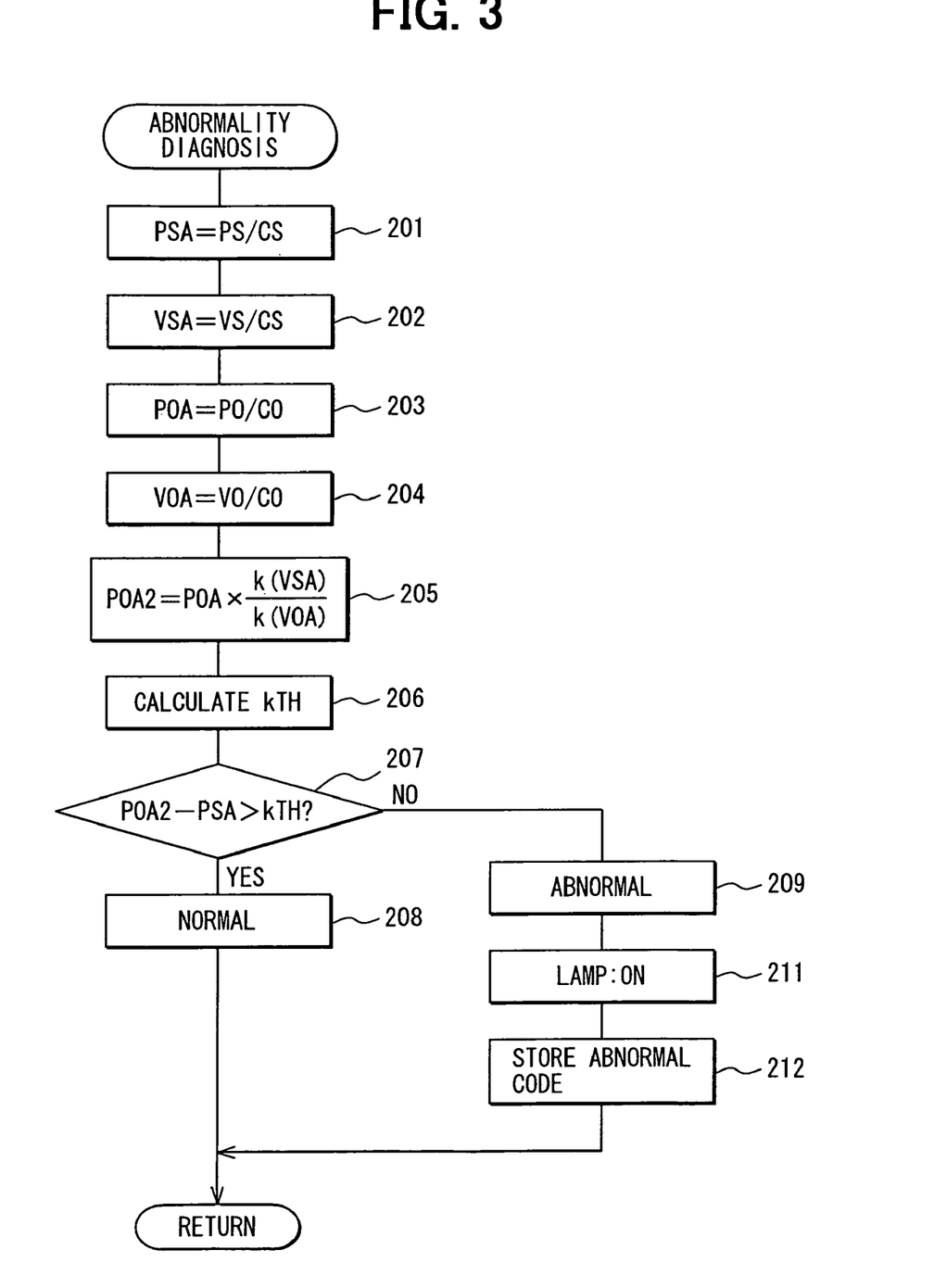
FIG. 3 is a flowchart showing an abnormality diagnostic routine for the secondary air supply system, according to the embodiment.

The ECU 23 performs the above abnormality diagnostic operation of the secondary air control system 17 in this embodiment by executing the routines shown in FIGS. 2, 3. Next, the abnormality diagnostic operation is described in detail.

Here, a routine of steps 107, 112, 202, and 204 serves as a first means, and a routine of steps 101, 102 serves as a second means.

The ECU 23 executes a secondary air control routine shown in FIG. 2 at a predetermined time cycle such as 32 ms, while the ignition switch in turned ON. When the routine is executed, the ECU 23 evaluates a condition for executing the secondary air control in step 101 in accordance with the following conditions. The first condition is whether a secondary air control flag is 0 when the secondary air control is not completed. The second condition is whether cooling water temperature detected using the water temperature sensor 26 is in a predetermined range. The third condition is whether a rotation speed of the engine is in a range, in which the engine is in an idling operation. The fourth condition is whether an engine load is in a range, in which the engine is in the idling operation. The fifth condition is whether variation in electric load is in a predetermined degree. Specifically, a large electric load is not turned ON and OFF in the fifth condition.

When the above five conditions are satisfied, the condition for executing the secondary air control is satisfied. However, at least one of the five conditions is not satisfied, the condition for executing the secondary air control is not satisfied, and the routine terminates.

When the above five conditions are satisfied, the condition for executing the secondary air control is satisfied, and the routine proceeds to step 102. The ECU 23 calculates an absolute value |V(i−1)−V(i)| of difference between a previous detection value V(i−1) of the power source voltage and a present detection value V(i) of the power source voltage in step 102. The ECU 23 compares the absolute value |V(i−1)−V(i)| with a threshold kDV. When the ECU 23 determines the absolute value |V(i−1)−V(i)| to be equal to or greater than the threshold kDV, the routine terminates without executing the following abnormality diagnostic operation.

When the ECU 23 determines the absolute value |V(i−1)−V(i)| to be less than the threshold kDV, the routine proceeds to step 103, in which the ECU 23 evaluates whether the operating condition is in the first detecting period (t1–t2). When the operating condition is in the first detecting period (t1–t2), the ECU 23 opens the control valve 21 in step 104, and the ECU 23 starts the air pump 18 in step 105, so that secondary air is supplied into the exhaust pipe 14. Furthermore, the routine proceeds to step 106, in which the ECU 23 integrates the secondary air pressure P detected using the pressure sensor 22 to calculate a secondary air pressure integrated value (integrated pressure) PS in the first detecting period (t1–t2). The routine proceeds to step 107, in which the ECU 23 integrates the power source voltage V detected using the power source voltage detecting circuit 27 to calculate a power source voltage integrated value (integrated voltage) VS in the first detecting period (t1–t2). In step 108, the ECU 23 increments an integration counter CS, which counts the number of integration of the power source voltage V in the first detecting period (t1–t2). The ECU 23 repeats the routine in steps 104 to 108 in the first detecting period (t1–t2).

When the first detecting period (t1–t2) finishes, the ECU 23 makes a negative determination in step 103, and the routine proceeds to step 109, in which the ECU 23 evaluates whether the operating condition is in the second detecting period (t2–t3). When the operating condition is in the second detecting period (t2–t3), the routine proceeds to step 110, in which the ECU 23 closes the control valve 21 to stop supplying secondary air into the exhaust pipe 14. However, the ECU 23 continues operation of the air pump 18 to perform the abnormality diagnostic operation of the secondary air control system 17.

In step 111, the ECU 23 integrates the secondary air pressure P detected using the pressure sensor 22 to calculate a secondary air pressure integrated value (integrated pressure) PO in the second detecting period (t2–t3). In step 112, the ECU 23 integrates the power source voltage V detected using the power source voltage detecting circuit 27 to calculate a power source voltage integrated value (integrated voltage) VO in the second detecting period (t2–t3). In step 113, the ECU 23 increments an integration counter CO, which counts the number of integration of the power source voltage V in the second detecting period (t2–t3). The ECU 23 repeats the routine in steps 110 to 113 in the second detecting period (t2–t3).

When the second detecting period (t2–t3) finishes, the ECU 23 makes a negative determination in step 109, and the routine proceeds to step 114, in which the ECU 23 executes an abnormality diagnostic routine for the secondary air control system 17 to evaluate abnormality in the secondary air control system 17. In step 115, the ECU 23 sets a secondary air control completion flag at 1, which represents a state, in which the secondary air control completes. In step 116, the ECU 23 stops the air pump 18, so that the routine terminates.

The abnormality diagnostic routine for the secondary air control system 17 shown in FIG. 3 is executed in step 114 in the secondary air control routine referred to FIG. 2.

The abnormality diagnostic routine for the secondary air control system 17 serves as an abnormality diagnostic means. When the abnormality diagnostic routine is executed, the routine proceeds to step 201. In step 201, the ECU 23 divides the integrated pressure PS in the first detecting period (t1–t2) by the integration counter CS to calculate a first average secondary air pressure (first average pressure) PSA in the first detecting period (t1–t2) in accordance with the formula provided below.

$$PSA=PS/CS$$

In step 202, the ECU 23 divides the integrated voltage VS in the first detecting period (t1–t2) by the integration counter CS to calculate a first average power source voltage (first average voltage) VSA in the first detecting period (t1–t2) in accordance with the formula provided below.

$$VSA=VS/CS$$

In step 203, the ECU 23 divides the integrated pressure PO in the second detecting period (t2–t3) by the integration counter CO to calculate a second average secondary air pressure (second average pressure) POA in the second detecting period (t2–t3) in accordance with the formula provided below.

$$POA=PO/CO$$

In step 204, the ECU 23 divides the integrated voltage VO in the second detecting period (t2–t3) by the integration counter CO to calculate a second average power source voltage (second average voltage) VOA in the second detecting period (t2–t3) in accordance with the formula provided below.

$$VOA=VO/CO$$

In step 205, the ECU 23 corrects the second average pressure POA in the second detecting period (t2–t3) to calculate a second corrected secondary air pressure (second corrected pressure) POA2 in the second detecting period (t2–t3) in accordance with the formula provided below.

$$POA2=POA \times k(VSA)/k(VOA)$$

Specifically, the ECU 23 corrects the second average pressure POA in accordance with the second average voltage VOA in the second detecting period (t2–t3) with respect to a standard, which is the first average voltage VSA in the first detecting period (t1–t2), so that the ECU 23 calculates the second corrected pressure POA2.

Figure 4:
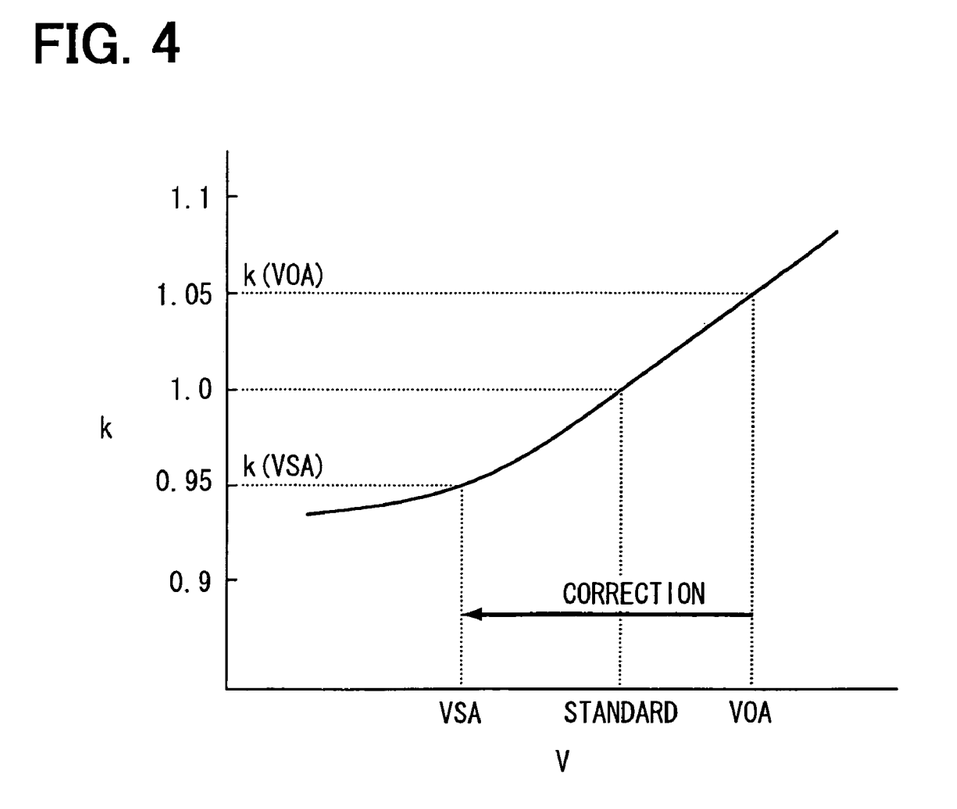
FIG. 4 is a graph showing an example of a data map of correction factors, according to the embodiment.

Here, k (VSA) and k (VOA) in the above formula are correction factors, which are obtained from a data map of correction factors shown in FIG. 4 in accordance with the first and second average voltages VSA, VOA.

Figure 5:
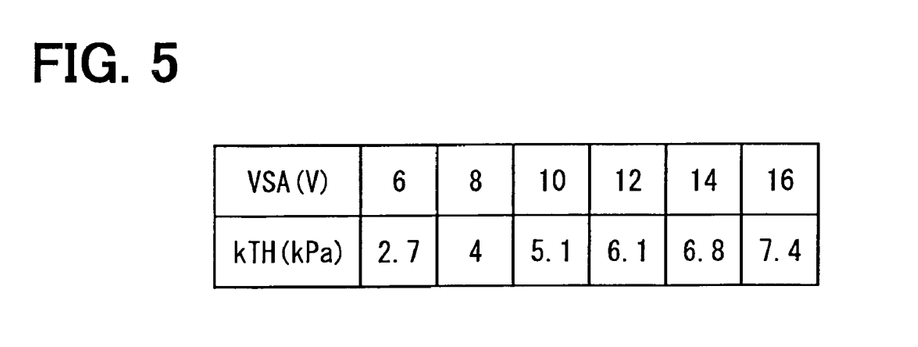
FIG. 5 is a table showing an example of a threshold calculation table, according to the embodiment.

The routine proceeds to step 206, in which the ECU 23 obtains a threshold kTH from a threshold calculation table shown in FIG. 5 in accordance with the standard, which is the first average voltage VSA. In the threshold calculation table, the threshold kTH increases as the first average voltage VSA increases. The routine in steps 205, 206 serves as an evaluating condition correcting means that corrects an evaluating condition (POA, kTH), which is for evaluating abnormality in the secondary air control system 17, in accordance with a power source voltage information (VSA, VOA).

The routine proceeds to step 207, in which the ECU 23 calculates a difference (POA2–PSA) between the second corrected pressure POA2 in the second detecting period (t2–t3) and the first average pressure PSA in the first detecting period (t1–t2). The ECU 23 compares the difference (POA2–PSA) with the threshold kTH. When the difference (POA2–PSA) is greater than the threshold kTH, the routine proceeds to step 208, in which the secondary air control system 17 is determined to be normal, and the routine terminates.

By contrast, when the ECU 23 determines the difference (POA2–PSA) to be equal to or less than the threshold kTH, the routine proceed to step 209, in which the ECU 23 determines the secondary air control system 17 to be abnormal. In step 211, the ECU 23 turns a warning lamp ON, or blinks the warning lamp. Alternatively, the ECU 23 indicates an alarm on an indicator in an instrument panel of a driver's seat. In step 212, the ECU 23 stores abnormal information such as an abnormal code in a nonvolatile memory such as a backup RAM, and the routine terminates.

In this embodiment, the ECU 23 corrects the evaluating condition (POA, kTH) for evaluating abnormality in the secondary air control system 17 in accordance with the power source voltage information (VSA, VOA).

Thus, the ECU 23 corrects the evaluating condition to be adapted to a condition, in which the power source voltage decreases, so that the ECU 23 can perform the abnormality diagnostic operation for the secondary air control system 17, even when the power source voltage decreases. Thereby, the ECU 23 can accurately perform the abnormality diagnostic operation, even when the power source voltage decreases, so that frequency of the abnormality diagnostic operation can be increased. Furthermore, the ECU 23 can correct the evaluating condition for evaluating abnormality in the secondary air control system 17 in accordance with the power source voltage when the abnormality diagnostic operation is performed. Thereby, the abnormality diagnostic operation can be restricted from making an erroneous determination due to variation in the power source voltage, so that reliability of the abnormality diagnostic operation can be enhanced.

In this embodiment, a period, in which the air pump 18 is turned ON, is divided into the first detecting period, in which the control valve 21 is opened, and the second detecting period, in which the control valve 21 is closed.

The ECU 23 detects the secondary air pressure and the power source voltage in each of the first and second detecting periods. The ECU 23 corrects the evaluating condition, which is for evaluating abnormality of the secondary air control system 17, in accordance with the power source voltage information (VSA, VOA) in the two detecting periods. Thereby, even when the power source voltage varies in the two detecting periods, the ECU 23 corrects the evaluating condition, which is for evaluating the abnormality, in accordance with the variation in the power source voltage. Thus, the ECU 23 can accurately perform the abnormality diagnostic operation to the secondary air control system 17.

Furthermore, in this embodiment, the average value of the power source voltage in each detecting period is used as the power source voltage information for correcting the evaluating condition, so that influences such as noise arising in the power source can be reduced, and accuracy of detecting the power source voltage information can be enhanced.

Furthermore, when the variation in the power source voltage is equal to or greater than the threshold kDV, or when variation in load of the power source is equal to or greater than a predetermined value, variation in detection value of the secondary air pressure becomes large. For example, when a large electric load is turned ON or OFF, variation in detection value of the secondary air pressure becomes large, and error of correction in the evaluating condition becomes large. In this embodiment, in consideration of these conditions, the ECU 23 prohibits performing the abnormality diagnostic operation when the variation in the power source voltage is equal to or greater than the threshold kDV, or when variation in load of the power source is equal to or greater than a predetermined value. Thereby, the abnormality diagnostic operation can be restricted from making an erroneous determination when variation in the power source voltage is large.

In this embodiment, the ECU 23 corrects the second average pressure POA in accordance with the second average voltage VOA in the second detecting period (t2–t3) with respect to a standard, which is the first average voltage VSA in the first detecting period (t1–t2). By contrast, the ECU 23 may correct the first average pressure PSA in the first detecting period (t1–t2) in accordance with the first average voltage VSA in the first detecting period (t1–t2) with respect to a standard, which is the second average voltage VOA in the second detecting period (t2–t3). Alternatively, the ECU 23 may set a constant standard value of the power source voltage, which is common between the two detecting periods (t1–t2), (t2–t3). In this case, the ECU 23 may correct the first and second average pressure in the two detecting periods (t1–t2), (t2–t3) respectively in accordance with a relationship between the average power source voltage (detection value) and the standard value of the power source voltage.

Alternatively, the ECU 23 may correct a difference (differential pressure) between the first and second average pressure in the two detecting periods (t1–t2), (t2–t3), in accordance with a relationship between the first and second average voltage in the two detecting periods.

In this embodiment, the ECU 23 corrects both the average pressure and the threshold in accordance with the power source voltage information as the evaluating condition of abnormality in the secondary air control system 17, so that accuracy of the evaluating condition is enhanced. However, the ECU 23 may correct one of the average pressure and the threshold in accordance with the power source voltage information.

In this embodiment, the ECU 23 detects the secondary air pressure using the pressure sensor 22 as the secondary air information. However, the ECU 23 may detect flow amount of secondary air discharged from the air pump 18 as the secondary air information.

The method of the abnormality diagnostic operation of the secondary air control system 17 may be modified as appropriate.

The number or the detecting periods is not limited two. The number or the detecting periods may be at least two.

The structures and methods of the above embodiments can be combined as appropriate.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A diagnostic device for a secondary air control system for an internal combustion engine, the secondary air control system supplying secondary air to an upstream of a catalyst in an exhaust passage of the internal combustion engine, the catalyst purifying exhaust gas, the diagnostic device comprising:

a secondary air detecting means that detects secondary air information, which relates to at least one of a flow amount of secondary air and pressure of secondary air;

an abnormality diagnostic means that performs an abnormality diagnostic operation of the secondary air control system in accordance with the secondary air information detected using the secondary air detecting means;

a voltage detecting means that detects power source voltage information, which relates to power source voltage supplied to the secondary air control system; and an evaluating condition correcting means that corrects an evaluating condition for evaluating abnormality in the secondary air control system, wherein the evaluating condition correcting means corrects the evaluating condition in accordance with the power source voltage information, which is detected using the voltage detecting means, and wherein the secondary air detecting means and the voltage detecting means respectively detect the secondary air information in a plurality of detecting periods and the power source voltage information in a plurality of detecting periods, the evaluating condition correcting means corrects the evaluating condition, which is for evaluating abnormality in the secondary air control system, in accordance with the power source voltage information in the plurality of detecting periods, and the abnormality diagnostic means performs the abnormality diagnostic operation of the secondary air control system in accordance with the secondary air information in the plurality of the detecting periods.

2. A diagnostic device for a secondary air control system for an internal combustion engine, the secondary air control system supplying secondary air to an upstream of a catalyst in an exhaust passage of the internal combustion engine, the catalyst purifying exhaust gas, the diagnostic device comprising:

a secondary air detecting means that detects secondary air information, which relates to at least one of a flow amount of secondary air and pressure of secondary air;

an abnormality diagnostic means that performs an abnormality diagnostic operation of the secondary air control system in accordance with the secondary air information detected using the secondary air detecting means;

a voltage detecting means that detects power source voltage information, which relates to power source voltage supplied to the secondary air control system; and an evaluating condition correcting means that corrects an evaluating condition for evaluating abnormality in the secondary air control system, wherein the evaluating condition correcting means corrects the evaluating condition in accordance with the power source voltage information, which is detected using the voltage detecting means, and wherein the voltage detecting means includes a first means that calculates at least one of an average power source voltage in a predetermined period and an integrated power source voltage in the predetermined period as the power source voltage information.

* * * * *